(12) United States Patent
Li et al.

(10) Patent No.: US 10,755,132 B2
(45) Date of Patent: Aug. 25, 2020

(54) METHODS FOR EXTRACTING SURFACE DEFORMATION FEATURE OF OBJECT BASED ON LINEAR SCANNING THREE-DIMENSIONAL POINT CLOUD

(71) Applicant: WUHAN WUDA ZOYON SCIENCE AND TECHNOLOGY CO., LTD., Wuhan (CN)

(72) Inventors: Qingquan Li, Wuhan (CN); Min Cao, Wuhan (CN); Dejin Zhang, Wuhan (CN); Hong Lin, Wuhan (CN); Ying Chen, Wuhan (CN)

(73) Assignee: WUHAN WUDA ZOYON SCIENCE AND TECHNOLOGY CO., LTD, Wuhan (CN)

( * ) Notice: Subject to any disclaimer, the term of this patent is extended or adjusted under 35 U.S.C. 154(b) by 241 days.

(21) Appl. No.: 16/313,440

(22) PCT Filed: Jan. 15, 2016

(86) PCT No.: PCT/CN2016/071062
§ 371 (c)(1),
(2) Date: Dec. 26, 2018

(87) PCT Pub. No.: WO2017/120897
PCT Pub. Date: Jul. 20, 2017

(65) Prior Publication Data
US 2019/0197340 A1    Jun. 27, 2019

(51) Int. Cl.
*G06K 9/46*      (2006.01)
*G06K 9/66*      (2006.01)
(Continued)

(52) U.S. Cl.
CPC .............. *G06K 9/4604* (2013.01); *G06T 5/20* (2013.01); *G06T 7/0002* (2013.01); *G06T 7/521* (2017.01); *G06T 2207/20032* (2013.01)

(58) Field of Classification Search
CPC ......... G06T 7/521; G06T 5/20; G06T 7/0002; G06T 2207/20032; G06K 9/6211;
(Continued)

(56) References Cited

U.S. PATENT DOCUMENTS

| 2010/0074532 A1* | 3/2010 | Gordon | G06K 9/2036 382/203 |
| 2015/0124086 A1* | 5/2015 | Melle | G01B 11/25 348/136 |

(Continued)

FOREIGN PATENT DOCUMENTS

CA         3023641     *   7/2017

*Primary Examiner* — Samir A Ahmed
(74) *Attorney, Agent, or Firm* — Platinum Intellectual Property LLP

(57) ABSTRACT

A method for extracting a surface deformation feature of an object based on linear scanning three-dimensional point cloud is disclosed comprising: performing data acquisition by using a three-dimensional measurement sensor based on line structured light, and obtaining a three-dimensional point cloud data of a surface of the object after data pre-processing; eliminating influences of abnormal data and textures on extraction of sectional main profiles, to accurately obtain the sectional main profiles of the object; obtaining a binary image based on deformation feature points extracted from sections, in conjunction with a deformation feature knowledge base, and preliminarily positioning a deformation region based on sub-block images to obtain a set of target morphology sub-blocks; then performing a morphological operation on deformation feature points in the set of target morphology sub-blocks, and generating a deformation region of confidence ROC, and then performing a region growth to extract a target using geometrical features of the ROC so as to guarantee completeness of detection of deformation regions; and finally, making statistics on deformation characteristic values of a deformation region in the surface (Continued)

of the object according to predefined deformation features, so as to accurately obtain complete attribute information about deformation of the object.

8 Claims, 7 Drawing Sheets

(51) Int. Cl.
*G06T 7/521* (2017.01)
*G06T 5/20* (2006.01)
*G06T 7/00* (2017.01)

(58) Field of Classification Search
CPC ............. G06K 9/3258; G06K 2209/01; G06K 9/00201; G06K 2209/40
See application file for complete search history.

(56) References Cited

U.S. PATENT DOCUMENTS

2016/0163037 A1* 6/2016 Dehais .................. G06T 7/0004
 382/110
2019/0234728 A1* 8/2019 Li ........................... G01S 17/89

* cited by examiner (a1)  (a2)  (a3)  (a4)

(b1)  (b2)  (b3)  (b4)

METHODS FOR EXTRACTING SURFACE DEFORMATION FEATURE OF OBJECT BASED ON LINEAR SCANNING THREE-DIMENSIONAL POINT CLOUD

RELATED APPLICATIONS

This application is a United States National Stage Application filed under 35 U.S.C 371 of PCT Patent Application Serial No. PCT/CN2016/071062, filed Jan. 15, 2016, the disclosure of all of which are hereby incorporated by reference in their entirety.

TECHNICAL FIELD

The disclosure relates to the technical field of surface detection, and in particular to the technical field of methods for extracting a deformation feature of an object.

BACKGROUND OF THE INVENTION

With the advancement of science and technology, there is a higher and higher requirement on the quality of objects, even to a degree of "almost perfection". Upon an object is subjected to a force, it will exhibit mechanical properties such as deformation and failure. It is one of important subjects in material science to make a material to be without exceeding its failure limit, while still having good stability and economy. Due to production defects or wear in use, various deformations, such as cracks, holes, road ruts, track bending, lining deformation, can deformation, pipe deformation, etc., may occur on a surface of an object, thereby affecting the performance of the object and even causing a safety accident. Therefore, a timely detection of surface deformation of objects has important value and significance in effectively preventing safety accidents, reducing economic losses, and improving product quality and the like.

At present, a vast majority of surface deformation detection methods of objects depend on the examination by human eyes, thus the detection result depends on subjectivity of a person. Meanwhile, as a person works for a long time, his or her eyes are prone to fatigue. At this time, false detection and miss detection rates are extremely high. Therefore, a detection method relying on human eyes cannot effectively detect surface deformation of an object, and at the same time waste a lot of resources of labor. In addition, there is an automated surface defect detection technology based on two-dimensional machine vision. This technology obtains two-dimensional profile information of surface defects of an object through brightness information reflected by the object, thereby realizing defect detection of the surface of the object. However, this detection method cannot obtain depth information on the defects of the object. Meanwhile, in many cases, as a notable two-dimensional feature of a defect cannot be obtained by utilizing a special light source, it becomes very difficult to identify the defect, thereby a result of identification is unsatisfactory as compared with that of the examination by human eyes, and a further study on the result of identification has to be made to meet requirements of detection in production.

At present, a three dimensional (3D) modeling technology has been widely used in a wide range of fields from macro land survey, three dimensional visualization, three dimensional animation, high precision three dimensional modeling to three dimensional printing. According to laser triangulation principle, a measurement method based on line structured light in combination with visual sensors can realize synchronous measurement in a same attitude and at a same time, that is, a complete section can be sampled through one measurement to ensure that the obtained data of the section is based on the same attitude. Three-dimensional information of a sectional profile of an object may be accurately obtained with high precision based on three-dimensional point cloud data measured based on line structured light in combination with visual sensors, and two-dimensional information of a defect may also be obtained at the same time, thereby complete information about deformation of the object, including a position of deformation, a degree of deformation, etc., can be obtained based on the three-dimensional point cloud data directly and conveniently.

Currently, there are two main types of automated surface defect detection technology:

(1) with a surface defect detection technology based on two-dimensional machine vision, imaging quality of a defect of a product is the key to affect an identification rate of defect, and a shape, orientation, surface material and texture of the defect all directly affect imaging quality. As the illumination of light can have impact on imaging of defects, different sources of light, illumination angles and intensities are used for different defects. However, it is difficult to propose a special algorithm with universality as there are so many kinds of defects, which proposes a big challenge for the identification of defects. Meanwhile, this kind of detection method cannot obtain depth information on defects of an object, that is, the degree of damage of defects cannot be accurately and effectively evaluated, and it is also impossible to detect whether a large range of deformation has occurred on the object.

(2) With an existing method for extracting deformation features of objects based on three dimensional laser radar technology, a rotating prism is used to measure a single section and a rotating gimbal is used to scan an entire field of view to acquire a three-dimensional point cloud of an object. Based on the time-of-flight differential pulse measurement, a measurement accuracy reaches millimeter level, and a measurement speed reaches more than one million points per second. The prism and the gimbal rotate synchronously during measurement, and a measurement section is a non-strict section (obtained not in a same time and in a same space), that is, the three-dimensional point cloud of a surface of the object is composed of discrete points. This method can be used to monitor a fixed site where an object deforms slowly. However, in areas such as road defect detection, tunnel surveying, track defect detection, online chip micro defect detection and cultural relic archaeology, it is required to measure in a high-dynamic environment, and it is required to obtain a section in a strict sense at one measurement, that is, the points on the section are measured at a same attitude and at a same time. For example, for road rutting detection, it requires that a measurement width is at least 2000 mm or more, the measurement resolution (sampling interval for the points on the same section) reaches at least millimeter level, the distance measurement accuracy reaches at least 0.01 mm, and the measurement frequency is 10 KHz or more, i.e., 200 million points may be measured per second. Conventional three dimensional laser radar measurement techniques are all unable to meet such requirements of measurement.

SUMMARY OF THE INVENTION

A technical problem of the present disclosure is to overcome the above drawbacks in the prior art by proposing a method for extracting surface deformation features of an object based on a linear scanning three-dimensional point cloud.

To achieve the above object, embodiments of the present invention provide a method for extracting surface deformation features of an object based on a linear scanning three-dimensional point cloud, comprising:

step 1: performing data acquisition by using a three-dimensional measurement sensor based on line structured light scanning to realize synchronous measurement of sectional profiles at same attitudes and at same times;

step 2: preprocessing the sectional profiles of the object measured by the three-dimensional measurement sensor by correcting a systematic error due to an installation deviation of the three-dimensional measurement sensor and a radian of laser lines in the measurement through a calibration file;

step 3: extracting sectional main profiles from the preprocessed sectional profiles of the object one by one;

step 4: obtaining features of the type of a large area deformation by analyzing a deviation between the sectional main profiles and standard profiles and obtaining features of the type of a small area deformation by analyzing a deviation between the preprocessed sectional profiles and the sectional main profiles, based on characteristics of the sectional profiles; and extracting deformation feature points of the sectional profiles in combination with a deformation feature knowledge base;

perfecting information in the deformation feature knowledge base by utilizing extracted deformation feature points of the sectional profiles;

step 5: forming a characteristic binary image by the deformation feature points, and making statistics on lengths and geometries of various connected regions in the characteristic binary image in combination with the deformation feature knowledge base, and then dividing the characteristic binary image into image sub-blocks which do not overlap with each other; for each image sub-block, labeling the image sub-block as a deformation target morphology sub-block if the image sub-block contains a long connected region or has feature points that have target morphological characteristics; wherein in the step 5, information in the deformation feature knowledge base may be perfected;

step 6: performing a morphological operation on deformation feature points in a set of deformation target morphology sub-blocks, removing noise regions of short-length, and generating a deformation region of confidence ROC; and then performing region growth to extract a target using the deformation region of confidence;

step 7: making statistics on deformation characteristic values of a deformation region in the surface of the object, including linear characteristic values, area array characteristic values, and degrees of deformation, according to pre-defined deformation features.

In some embodiments, the step 3, extracting the sectional main profiles from the preprocessed sectional profiles of the object one by one may comprise:

3-1, performing a median filtering on the preprocessed sectional profiles $PP_j$, $PP_j = \{PP_{j1}, PP_{j2}, \ldots, PP_{jn}\}$, where n is the number of points measured on a single section, to preliminarily obtain reference sectional profiles $RP_j$, $RP_j = \{RP_{j1}, RP_{j2}, \ldots, RP_{jn}\}$, in which abnormal data and texture have been removed, where n is the number of points measured on a single section;

3-2, calculating absolute distances $D_j$, $D_j = \{D_{j1}, D_{j2}, \ldots, D_{jn}\}$, from points of the preprocessed sectional profiles to points of the reference sectional profiles, where $D_{ji} = |PP_{ji} - RP_{ji}|$, $i = 1, 2, \ldots, n$, and n is the number of points measured on a single section;

3-3, sorting elements in calculated distances $D_j$ in ascending order to form a new set of distances $S_j$, $S_j = \{S_{j1}, S_{j2}, \ldots, S_{jn}\}$, where n is the number of points measured on a single section;

3-4, calculating a threshold $T_{j1}$, $T_{j1} = S_{jk}$, where k is a value obtained by rounding up a value of n*p, and p is a value of 60%~98%;

3-5, selecting and generating a new set of profile points $NP_j$, $NP_j = \{NP_{j1}, NP_{j2}, \ldots, NP_{jn}\}$, where n is the number of points measured on a single section; calculating values of elements in the set of profile points $NP_j$ according to the following formula:

$$NP_{ji} = \begin{cases} PP_{ji}, & PP_{ji} \leq T_{j1} \\ RP_{ji}, & PP_{ji} > T_{j1} \end{cases} \quad i = 1, 2, \ldots, n;$$

performing a mean filtering on the selected set of profile points $N_j$, thereby obtaining the sectional main profile $MP_j$, $MP_j = \{MP_{j1}, MP_{j2}, \ldots, MP_{jn}\}$, where n is the number of points measured on a single section.

In some embodiments, the step 4 may comprise extracting deformation feature points of the type of large area deformation of the current $j^{th}$ sectional profile, where $j = 1, 2, \ldots, m$, and m is the number of sections acquired, which may comprise:

4-1, taking the preprocessed sectional profile $PP_j$ and the sectional main profile $MP_j$ as inputs, $PP_j = \{PP_{j1}, PP_{j2}, \ldots, PP_{jn}\}$, $MP_j = \{MP_{j1}, MP_{j2}, \ldots, MP_{jn}\}$, where n is the number of points measured on a single section;

4-2, extracting a standard profile $SP_j$ matching with the current sectional profile $PP_j$, where $SP_j = \{SP_{j1}, SP_{j2}, \ldots, SP_{jn}\}$, in combination with acquisition position information of a section, where n is the number of points measured on a single section;

4-3, calculating deviations between the sectional main profile $MP_{ji}$ and the standard profile $SP_{ji}$, to form a set of deviations $DEV_j$, $DEV_j = \{DEV_{j1}, DEV_{j2}, \ldots, DEV_{jn}\}$, $DEV_{ji} = |MP_{ji} - SP_{ji}|$, $i = 1, 2, \ldots, n$;

4-4, extracting points whose deviations are greater than an accuracy requirement of detection of deformation $T_2$, as deformation feature points, and labeling the points with a value of 1, otherwise with a value of 0, and recording the values into a set of deformation feature label values $F_j = \{F_{j1}, F_{j2}, \ldots, F_{jn}\}$;

$$F_{ji} = \begin{cases} 1, & DEV_{ji} \geq T_2 \\ 0, & DEV_{ji} < T_2 \end{cases} \quad i = 1, 2, \ldots, n$$

(5) outputting the set of deformation feature label values $F_j$;

the step 4 may further comprise extracting deformation feature points of the type of small area deformation of the current $j^{th}$ sectional profile, where $j = 1, 2, \ldots, m$, and m is the number of sections acquired, which may comprise:

4-1', taking the preprocessed sectional profile $PP_j$ and the sectional main profile $MP_j$ as inputs, $PP_j = \{PP_{j1}, PP_{j2}, \ldots, PP_{jn}\}$, $MP_j = \{MP_{j1}, MP_{j2}, \ldots, MP_{jn}\}$, where n is the number of points measured on a section;

4-2', calculating absolute distances $DIS_j$, $DIS_j = \{DIS_{j1}, DIS_{j2}, \ldots, DIS_{jn}\}$, between various points of the preprocessed sectional profile $PP_j$ and corresponding points of the sectional main profile $MP_j$, where $DIS_{ji}=|PP_{ji}-MP_{ji}|$, i=1, 2, . . . , n, and n is the number of points measured on a section; and then averaging the absolute distances $Avg\_DIS_j=\Sigma_{i=1}^{n}DIS_{ji}/n$, so as to obtain a pavement texture value $Tex_j=Avg\_DIS_j$ of current section;

4-3', calculating points whose sectional deformation point segmentation threshold $T_{j3}=K*Tex_j$, where K is a threshold coefficient, and K>1;

4-4', calculating distances $S_j$, $S_j=\{S_{j1}, S_{j2}, \ldots, S_{jn}\}$, between various points of the preprocessed sectional profile $PP_j$ and corresponding points of the sectional main profile $MP_j$, where $S_{ji}=PP_{ji}-MP_{ji}$ or $S_{ji}=MP_{ji}-PP_{ji}$ or $S_{ji}=|MP_{ji}-PP_{ji}|$, i=1, 2, . . . , n, and n is the number of points measured on a section;

4-5', extracting points whose deviations are larger than the deformation point segmentation threshold $T_{j3}$ as the deformation feature points, and labeling the points with a value of 1, otherwise with a value of 0, and recording them into a set of deformation feature label values $F_j=\{F_{j1}, F_{j2}, \ldots, F_{jn}\}$;

$$F_{ji} = \begin{cases} 1, & S_i \geq T_{j3} \\ 0, & S_i < T_{j3} \end{cases} \quad i=1, 2, \ldots, n$$

4-6', outputting the set of deformation feature label values $F_j$.

In some embodiments, the step 5 may comprise:

5-1, inputting deformation feature points $F_j$ of a series of sections continuously acquired in the order of sections being acquired, where j=1, 2, . . . , m;

5-2, sequentially stitching extracted deformation feature points of the series of sections to form a characteristic binary image $F=\{F_{ji}|j=1, 2, \ldots, m, i=1, 2, \ldots, n\}$;

5-3, performing connected domain labeling on the binary image, recording label values as $FR=\{FR_{ji}|j=1, 2, \ldots, m, i=1, 2, \ldots, n\}$, and making statistics on lengths $URL_u$ and geometries of various connected regions $UR_u$ in a connected domain labeling image FR, where $UR_u$ is a connected region with a label value of u, u=1, 2, . . . , U, U is the total number of the connected regions, and $URL_u$ is a length of a long side or diagonal of a circumscribed rectangle of the connected region with the label value of u;

5-4, dividing a current binary image reasonably into image sub-blocks $SU=\{SU_{xy}|x=1, 2, \ldots, M, y=1, 2, \ldots, N\}$, $SU_{xy}=\{F_{ji}|j\in X_x, i\in Y_y\}$, which do not overlap with each other and have a size of sm*sn respectively, where M=sm is the number of sub-blocks in a row direction in a sub-block image, and N=n/sn is the number of sub-blocks in a column direction in the sub-block image, $X_x\in[(x-1)*sm+1x*sm]$ and $X_x\in Z^*$, $Y_y\in[(y-1)*sn+1y*sn]$ and $Y_y\in Z^*$;

5-5, obtaining morphological characteristics of deformation feature points in various image sub-blocks, including directional feature $SUD_{xy}$, where x=1, 2, . . . , M, y=1, 2, . . . , N, in combination with morphological characteristics of a deformation target;

5-6, setting x=1, and y=1; starting to discuss whether the current image sub-block is a deformation target morphology unit;

5-7, if a sub-block image contains a connected region with a length greater than $T_4$, which is obtained from the deformation knowledge base, then labeling the current sub-block as the deformation target morphology unit, which calculates according to the following formula, and recording a label value $FSU_{xy}=1$ otherwise going to a step (8);

$$FSU_{xy} = \begin{cases} 1, & \exists u = FR_{ji}, \text{ where } j \in X_x, i \in Y_y \text{ s.t. } URL_u \geq T_4 \\ 0, & \text{otherwise} \end{cases}$$

5-8, if the deformation feature points in the current sub-block image have deformation target morphological characteristics, labeling the current sub-block as a deformation target morphology unit, and recording a label value $FSU_{xy}=1$, otherwise recording a label value $FSU_{xy}=0$;

5-9, if y is less than N, setting y=y+1 and going to step 5-7; otherwise, going to step 5-10;

5-11, if x is less than M, setting x=x+1, y=1, and going to step 5-7; otherwise, going to step 5-11;

5-11, outputting a set of deformation target morphology sub-blocks $FS=\{FS_{ji}|j=1, 2, \ldots, m, i=1, 2, \ldots, n\}$, whose values are calculated as follows:

$$FS_{ji} = \begin{cases} 1, & F_{ji} > 0 \text{ and } FSU_{xy} > 0, \text{ where } j \in X_x, i \in Y_y \\ 0, & \text{otherwise} \end{cases}.$$

Advantageous effects of the present disclosure include:

(1) according to some embodiments of the invention, a preprocessing is conducted and a calibration file is used to effectively correct a systematic error in a sectional profile of an object measured by a three-dimensional measurement sensor due to an installation of the sensor and a radian of laser lines, and at the same time, some abnormal noise points with a value of zero existing in the sectional profile of the object measured by the three-dimensional measurement sensor are processed to obtain true information of the sectional profile of the object being measured, so that a good input is provided for subsequent surface deformation feature extraction of the object.

(2) According to some embodiments of the invention, a median filtering is firstly utilized to preliminarily obtain reference sectional profiles, in which abnormal data and texture have been removed, then absolute distances Di from points of preprocessed sectional profiles to points of the reference sectional profiles are calculated, and calculated distances are sorted. According to profile characteristics of a section, an appropriate proportion P of profile points which deviate from the reference sectional profiles with small distances, are selected, while profile points which deviate from the reference sectional profiles with large distances are substituted by points on the reference sectional profiles. A mean filtering is performed on the selected points, and then sectional main profiles are obtained. In the process of extracting sectional main profiles, the influences of abnormal data and texture on the extraction of the sectional main profiles are eliminated, therefore, the sectional main profiles of the object can be accurately obtained.

(3) According to some embodiments of the invention, in the process of extracting deformation features of an object, features of the type of a large area deformation are obtained by analyzing deviations between sectional main profiles and standard profiles, and features of the type of a small area deformation, such as cracks and holes, are obtained by analyzing the deviations of preprocessed sectional profiles and sectional main profiles. That is, for a single sectional profile, effective feature extracting processes are designed respectively for deformation regions of different sizes on a surface of the object in the disclosure, so that effective extraction for different types of deformation regions and complete extraction for the whole deformation regions can be guaranteed.

(4) According to some embodiments of the invention, the deformation feature points extracted for a series of sections are formed into a characteristic binary image, and statistics are made on lengths and geometries (directions, shapes, etc.) of various connected regions in the binary image in conjunction with a deformation feature knowledge base, and then the current binary image is reasonably divided into image sub-blocks that do not overlap with each other. For each sub-block, if the sub-block contains a long connected region, or has feature points that have target morphological characteristics, the sub-block is labeled as a deformation skeleton. Therefore, a fast and accurate positioning of a deformation region can be achieved.

(5) According to some embodiments of the invention, morphological characteristics of deformation feature points are used to conduct a region growth to extract a target, so that completeness of detection of a deformation region can be guaranteed.

(6) According to some embodiments of the invention, statistics on deformation features of deformation regions on a surface of an object are made based on predefined deformation features, thereby complete attribute information of deformation of the object can be accurately obtained.

(7) A deformation feature knowledge base is equivalent to an experience summary knowledge base. In extracting a specific deformation feature, based on information in the deformation feature knowledge base, a predefined specific deformation feature is extracted. In the process of applying the method of the present invention, information in the deformation feature knowledge base is perfected, thereby gradually improving stability and reliability of the deformation feature knowledge base.

BRIEF DESCRIPTION OF THE DRAWINGS

The technical solutions of the present invention will be further described in detail below with reference to the accompanying drawings and specific embodiments.

DETAILED DESCRIPTION OF THE INVENTION

Different objects have different shapes, textures, sizes and other features, and different measured objects have also different deformation features. For example, a diameter of a pipeline is an important feature in a detection of deformation of the pipeline, while there is not a feature of diameter for a planar object. For another example, it is normal for an asphalt pavement whose texture deviates from a main profile of the pavement by 2 mm~5 mm, while it is severe for a component whose sectional profile deviates from a standard profile by 1 mm. Therefore, different measured objects have different deformation features, and it is necessary to specifically define deformation features respectively for different detection objects.

Common deformation features include linear features (depth, length, width, curvature, direction and distance of deformation, etc.), area array features (depth and area of deformation region, etc.), features regarding degree of deformation (such as light, medium, heavy), features of continuity, etc.

In a specific deformation feature extraction, a predefined specific deformation feature is extracted in conjunction with information of a deformation feature knowledge base, and the information of the deformation feature knowledge base may be perfected in a process of data application.

Figure 1:
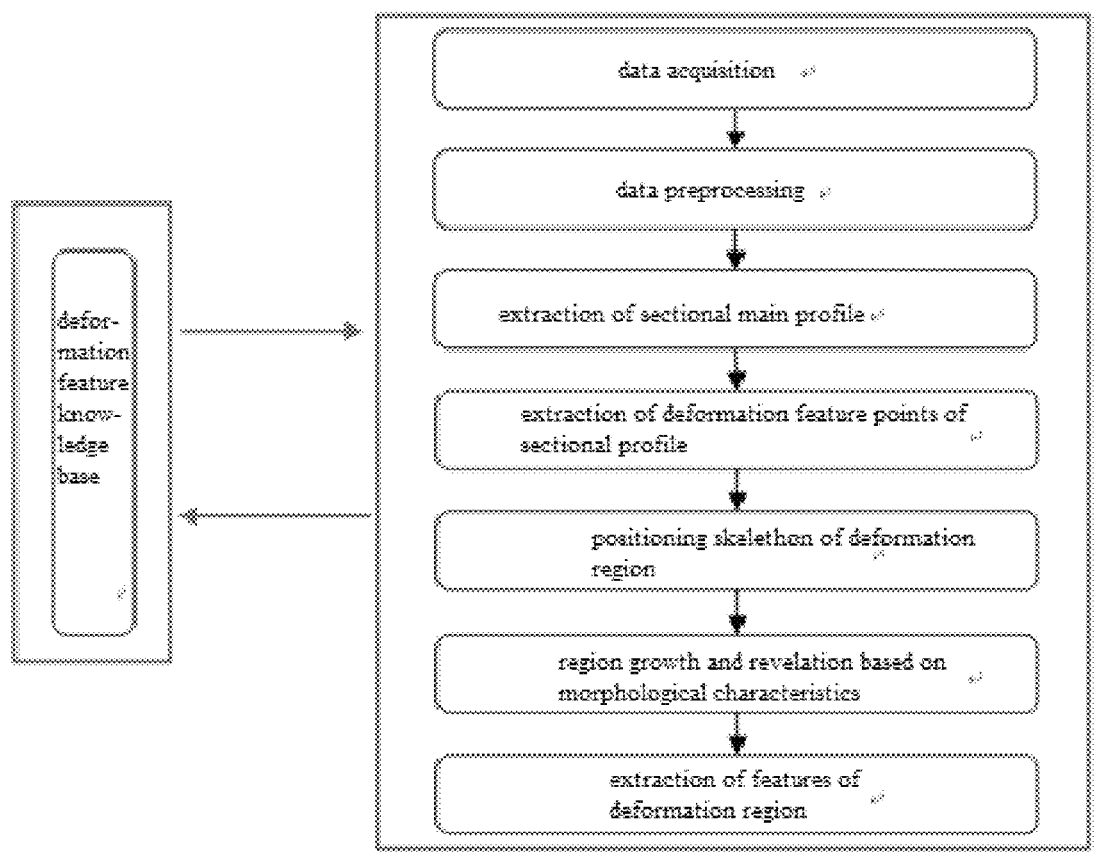
FIG. 1 is a general flow chart according to an embodiment of the present invention.

A general embodiment of the invention is shown in FIG. 1, the steps thereof are described in detail below.

Data Acquisition Step

Figure 2:
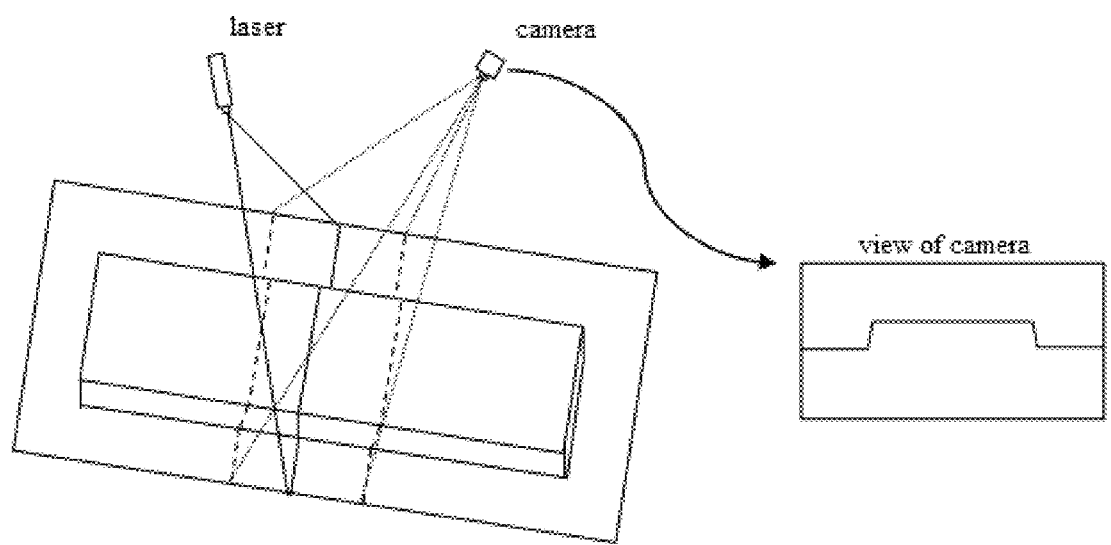
FIG. 2 is a schematic diagram showing a principle of a three-dimensional measurement structure based on line structured light scanning.

An embodiment of the disclosure utilizes three-dimensional measurement technology based on line structured light scanning, simply referred to as linear scanning three-dimensional measurement technology, in which relative changes of a surface of a measured object are measured by a senor, to reflect a degree of change on the surface of the measured object. The principle of this measurement technology is shown in FIG. 2.

Data acquisition involved in the disclosure is conducted by using the above-mentioned three-dimensional measurement sensor based on line structured light scanning, which can realize synchronous measurement of a sectional profile in a same attitude and at a same time. There are two ways of acquisition. One way of acquisition is that, the three-dimensional measurement sensor is mounted on a fixed support, and a measured object passes through a measurement area within a measurement range of the three-dimensional measurement sensor at a certain speed, and during the object is moving, three-dimensional profile data of the object are acquired. Another way of acquisition is that, the three-dimensional measurement sensor is mounted on a moving carrier, and during the carrier is moving, the three-dimensional profile data of the object are acquired.

Data Preprocessing Step

A three-dimensional measurement sensor based on line structured light combined with a visual sensor (hereinafter referred to as a three-dimensional measurement sensor) is essentially composed of a word line laser and an area array camera. Due to production process, laser lines emitted by the word line laser cannot achieve an absolute collimation, that is, may have a certain degree of curve. In addition, there is an included angle of installation between the laser lines and an optical axis of the camera. Therefore, the sectional profile of the object measured by the three-dimensional measurement sensor needs to be corrected through a calibration file. In the prior art, there are a plurality of methods of calibration, which involve conventional means and therefore will not be described again. In addition, due to changes in a measurement environment, there may be some abnormal noise points in the sectional profile of the object measured by the three-dimensional measurement sensor (a point with a value of zero occurs when there is water stain and oil stain on the surface of the measured object or a measured area is covered by an object, etc.). According to an embodiment of the present invention, the point with the value of zero is substituted by a value obtained by averaging non-zero values in an area approximate to the point with the value of zero.

Sectional Main Profile Extraction Step

Firstly, reference sectional profiles, in which local defects and large-depth texture have been removed, are preliminarily obtained by utilizing a median filtering, then absolute distances from points of the preprocessed sectional profiles to points of the reference sectional profiles are calculated, and the calculated distances are sorted. According to characteristics of the sectional profiles, an appropriate proportion (about 60%~98%) of profile points, which deviate from the reference sectional profiles by a small distance (equal to or less than $T_1$), are selected, while profile points, which deviate from the reference sectional profiles by a large distance (larger than $T_1$), are substituted by points on the reference sectional profiles. A mean filtering is conducted on the selected points to obtain sectional main profiles. For the current $j^{th}$ sectional profile acquired, where j=1, 2, . . . , m, and m is the number of sections acquired, extraction steps of sectional main profile are as follows:

(1) performing the median filtering on a preprocessed sectional profile $PP_j$, $PP_j=\{PP_{j1}, PP_{j2}, \ldots, PP_{jn}\}$, where n is the number of points measured on a single section, to preliminarily obtain a reference sectional profile $RP_j$, $RP_j=\{RP_{j1}, RP_{j2}, \ldots, RP_{jn}\}$, in which abnormal data and texture have been removed, where n is the number of points measured on a single section;

(2) calculating absolute distances $D_j$, $D_j=\{D_{j1}, D_{j2}, \ldots, D_{jn}\}$, from points of the preprocessed sectional profile to points of the reference sectional profile, where $D_{ji}=|PP_{ji}-RP_{ji}|$, i=1, 2, . . . , n, and n is the number of points measured on a single section;

(3) sorting elements in the calculated distances $D_j$ in ascending order to form a new set of distances $S_j$, $S_j=\{S_{j1}, S_{j2}, \ldots, S_{jn}\}$, where n is the number of points measured on a single section;

(4) calculating a threshold $T_{j1}$, $T_{j1}=S_{jk}$, where k is a value obtained by rounding up a value of n*p, and p is about a value of 60%~98%;

(5) selecting and generating a new set of profile points $NP_j$, $NP_j=\{NP_{j1}, NP_{j2}, \ldots, NP_{jn}\}$, where n is the number of points measured on a single section, wherein values of elements in the set of profile points $NP_j$ are calculated according to the following formula;

$$NP_{ji} = \begin{cases} PP_{ji}, & PP_{ji} \leq T_{j1} \\ RP_{ji}, & PP_{ji} > T_{j1} \end{cases} \quad i = 1, 2, \ldots, n$$

(6) performing a mean filtering on the selected set of profile points $NP_j$, thereby obtaining the sectional main profile $MP_j$, $MP_j=\{MP_{j1}, MP_{j2}, \ldots, MP_{jn}\}$, where n is the number of points measured on a single section.

Extraction Step of Deformation Feature Points of Sectional Profile

Figure 3:
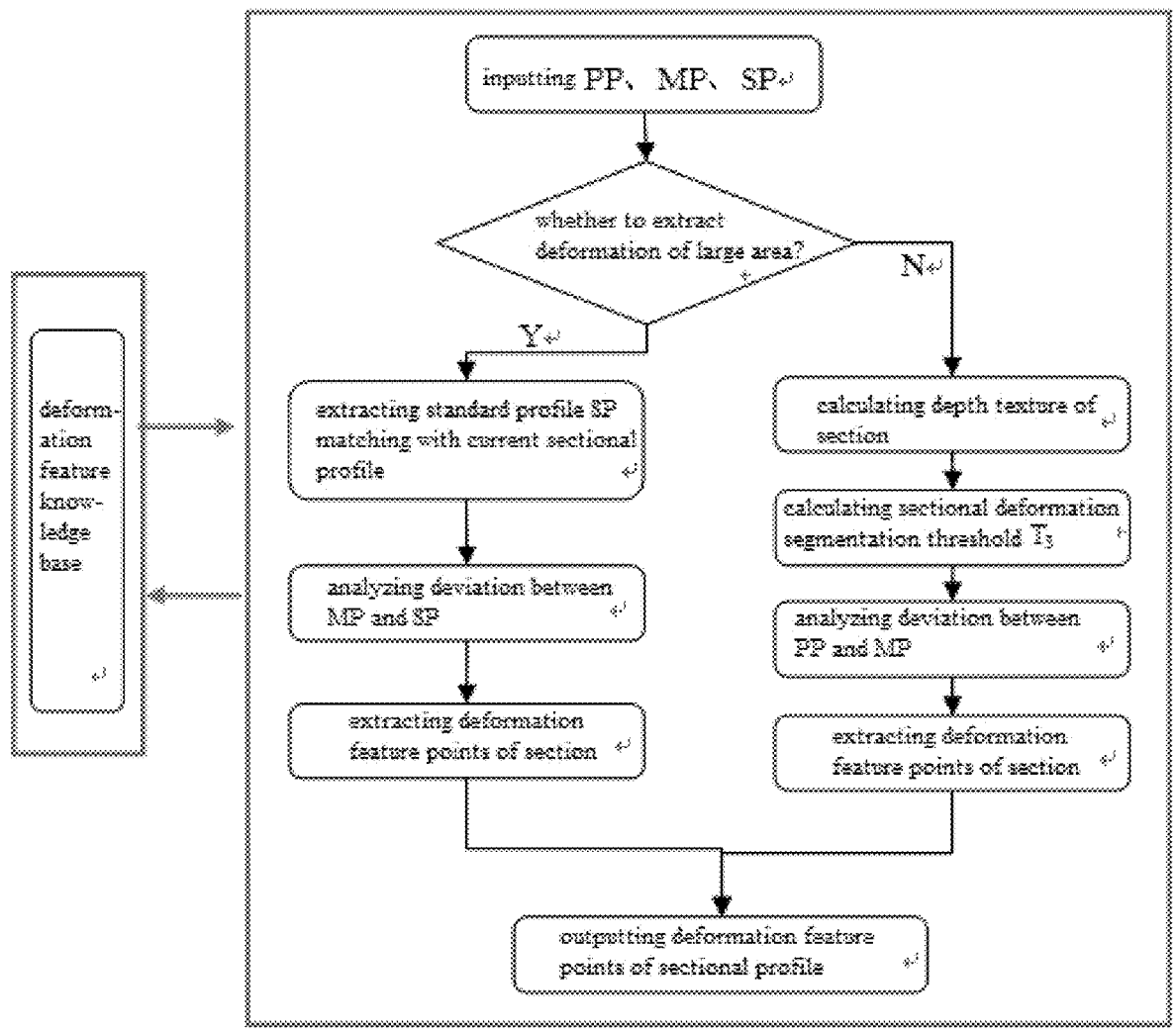
FIG. 3 is a flow chart of extracting deformation feature points of a sectional profile.

Based on characteristics of sectional profiles, deviations between sectional main profiles MP and standard profiles SP are analyzed to obtain features of the type of large area deformation, and the deviations between preprocessed sectional profiles PP and the sectional main profiles MP are analyzed to obtain features of the type of small area deformation (such as a crack, a hole). Deformation feature points of sectional profiles are extracted in combination with a deformation feature knowledge base. The flowchart of the extraction step of deformation feature points of sectional profile is shown in FIG. 3.

The specific step of extracting deformation feature points of the type of large area deformation from the current $j^{th}$ sectional profile, wherein j=1, 2, . . . , m, and m is the number of sections acquired, may include:

(7) taking a preprocessed sectional profile $PP_j$ and a sectional main profile $MP_j$ as inputs, wherein $PP_j=\{PP_{j1}, PP_{j2}, \ldots, PP_{jn}\}$, $MP_j=\{MP_{j1}, MP_{j2}, \ldots, MP_{jn}\}$, and n is the number of points measured on a single section;

(8) extracting a standard profile $SP_j$ matching with the current sectional profile $PP_j$, in combination with acquisition position information of a section (the current position information of an acquisition device or position information of a measured object), wherein $SP_j=\{SP_{j1}, SP_{j2}, \ldots, SP_{jn}\}$, and n is the number of points measured on a single section;

(9) calculating deviations between the sectional main profile $MP_{ji}$ and the standard profile $SP_{ji}$, to form a set of deviations $DEV_j$, $DEV_j=\{DEV_{j1}, DEV_{j2}, \ldots, DEV_{jn}\}$, $DEV_{ji}=|MP_{ji}-SP_{ji}|$, i=1, 2, . . . , n;

(10) extracting points whose deviations are greater than an accuracy requirement of detection of deformation $T_2$, as deformation feature points, and labeling the points with a value of 1, otherwise with a value of 0, and recording the values into a set of deformation feature label values $F_j=\{F_{j1}, F_{j2}, \ldots, F_{jn}\}$;

$$F_{ji} = \begin{cases} 1, & DEV_{ji} \geq T_2 \\ 0, & DEV_{ji} < T_2 \end{cases} \quad i = 1, 2, \ldots, n$$

(11) outputting the set of deformation feature label values $F_j$.

The specific step of extracting deformation feature points of the type of small area deformation from the current $j^{th}$ sectional profile, where j=1, 2, . . . , m, and m is the number of sections acquired, may include:

(12) taking the preprocessed sectional profile $PP_j$ and the sectional main profile $MP_j$ as inputs, wherein $PP_j=\{PP_{j1}, PP_{j2}, \ldots, PP_{jn}\}$, $MP_j=\{MP_{j1}, MP_{j2}, \ldots, MP_{jn}\}$, and n is the number of points measured on a section;

(13) calculating absolute distances $DIS_j$, $DIS_j=\{DIS_{j1}, DIS_{j2}, \ldots, DIS_{jn}\}$, between various points of the preprocessed sectional profile $PP_j$ and corresponding points of the sectional main profile $MP_j$, where $DIS_{ji}=|PP_{ji}-MP_{ji}|$, i=1, 2, . . . , n, and n is the number of points measured on a section; and then averaging the absolute distances $Avg\_DIS_j=\Sigma_{i=1}^{n} DIS_{ji}/n$, so as to obtain pavement texture values of current section $Tex_j=Avg\_DIS_j$;

(14) calculating points whose sectional deformation point segmentation threshold $T_{j3}=K*Tex_j$, where K is a threshold coefficient, and K>1;

(15) calculating distances $S_j$, $S_j=\{S_{j1}, S_{j2}, \ldots, S_{jn}\}$, between various points of the preprocessed sectional profile $PP_j$ and corresponding points of the sectional main profile $MP_j$, where $S_{ji}=PP_{ji}-MP_{ji}$ or $S_{ji}=MP_{ji}-PP_{ji}$ or $S_{ji}=|MP_{ji}-PP_{ji}|$, i=1, 2, . . . , n, and n is the number of points measured on a section;

(16) extracting points whose deviations are larger than the deformation point segmentation threshold $T_{j3}$ as the deformation feature points, and labeling the points with a value of 1, otherwise with a value of 0, and recording them into a set of deformation feature label values $F_j=\{F_{j1}, F_{j2}, \ldots, F_{jn}\}$;

$$F_{ji} = \begin{cases} 1, & S_i \geq T_{j3} \\ 0, & S_i < T_{j3} \end{cases} \quad i = 1, 2, \ldots, n$$

(17) Outputting the set of deformation feature label values $F_j$.

During the method is applied, the information in the deformation feature knowledge base may be perfected to improve the stability and reliability of the deformation feature knowledge base.

Step of Positioning a Skeleton of a Deformation Region

Figure 4:
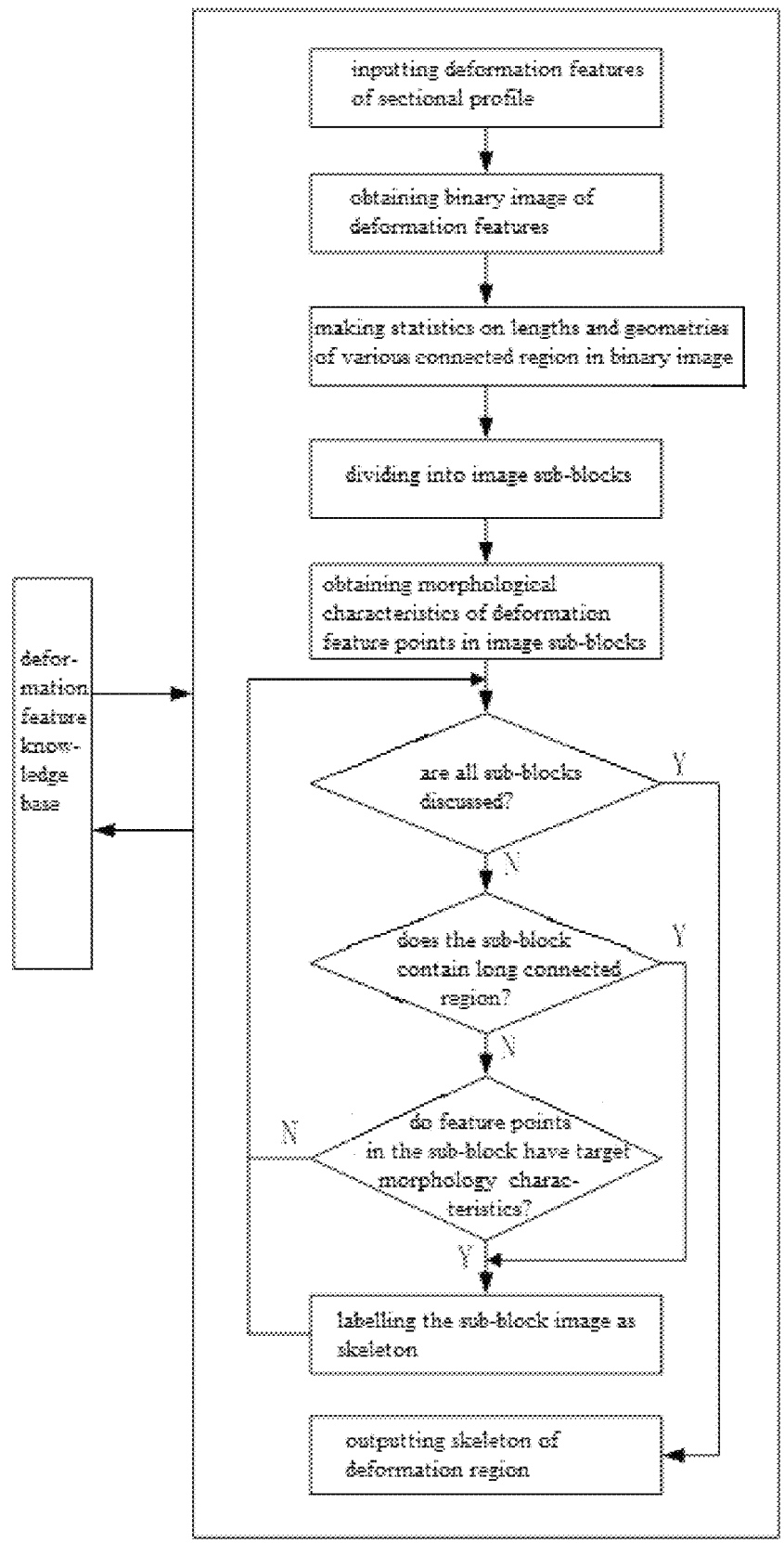
FIG. 4 is a flow chart of positioning a deformation region.

In the process of positioning a deformation region, firstly, the deformation feature points extracted for a series of sections are formed into a characteristic binary image, and statistics are made on lengths and geometries (directions, shapes, etc.) of various connected regions in the binary image in conjunction with a deformation feature knowledge base, and then the current binary image is reasonably divided into image sub-blocks that do not overlap with each other. For each sub-block, if the sub-block contains a long connected region, or has feature points that have target morphological characteristics, the sub-block is labeled as a deformation skeleton. Therefore, a fast and accurate positioning of deformed regions can be achieved. The process of positioning a skeleton of a deformation region is shown in FIG. 4, and the specific steps thereof are as follows:

(18) inputting deformation feature points $F_j$ of a series of sections continuously acquired, in the order of the sections being acquired, where j=1, 2, . . . , m;

(19) sequentially stitching extracted deformation feature points of the series of sections to form a characteristic binary image $F=\{F_{ji}|j=1, 2, \ldots, m, i=1, 2, \ldots, n\}$;

(20) performing connected domain labeling on the binary image, recording label values as $FR=\{FR_{ji}|j=1, 2, \ldots, m, i=1, 2, \ldots, n\}$, and making statistics on lengths $URL_u$ and geometries of various connected regions $UR_u$ in a connected domain labeling image FR, where $UR_u$ is a connected region with a label value of u, u=1, 2, . . . , U, and U is the total number of the connected regions, and $URL_u$ is a length of a long side or diagonal of a circumscribed rectangle of the connected region with the label value of u;

(21) dividing a current binary image reasonably into image sub-blocks $SU=\{SU_{xy}|x=1, 2, \ldots, M, y=1, 2, \ldots, N\}$, $SU_{xy}=\{F_{ji}|j\in X_x, i\in Y_y\}$, which do not overlap with each other and have a size of sm*sn respectively, where M=m/sm is the number of sub-blocks in the sub-block image in a row direction, and N=n/sn is the number of sub-blocks in the sub-block image in a column direction, $X_x\in[(x-1)*sm+1x*sm]$ and $X_x\in Z^*$, $Y_y\in[(y-1)*sn+1y*sn]$ and $Y_y\in Z^*$;

(22) obtaining morphological characteristics of deformation feature points in various image sub-blocks, such as directional features $SUD_{xy}$ (obtained by least square fitting or direction projection), where x=1, 2, . . . , M, y=1, 2, . . . , N, in combination with morphological characteristics of a deformation target;

(23) setting x=1, and y=1; starting to discuss whether the current image sub-block is a deformation skeleton unit;

(24) if the sub-block image contains a connected region with a length greater than $T_4$ (which is obtained from the deformation knowledge base), then labeling the current sub-block as the skeleton unit (calculating according to the following formula), and recording a label value $FSU_{xy}=1$, otherwise going to a step (25);

$$FSU_{xy} = \begin{cases} 1, & \exists u = FR_{ji}, \text{ where } j \in X_x, i \in Y_y \text{ s.t. } URL_u \geq T_4 \\ 0, & \text{otherwise} \end{cases}$$

(25) if the deformation feature points in the current sub-block image have a deformation target morphological characteristics such as a crack having strong linear characteristics, labeling the current sub-block as a skeleton unit, and recording a label value $FSU_{xy}=1$, otherwise recording a label value $FSU_{xy}=0$;

(26) if y is less than N, setting y=y+1 and going to step (24); otherwise, going to step (27);

(27) if x is less than M, setting x=x+1, y=1, and going to step (24); otherwise, going to step (28);

(28) outputting deformation region skeletons $FS=\{FS_{ji}|j=1, 2, \ldots, m, i=1, 2, \ldots, n\}$, whose values are calculated as follows:

$$FS_{ji} = \begin{cases} 1, & F_{ji} > 0 \text{ and } FSU_{xy} > 0, \text{ where } j \in X_x, i \in Y_y \\ 0, & \text{otherwise} \end{cases}.$$

During the method is applied, the information in the deformation feature knowledge base may be perfected and thus the stability and reliability of the deformation feature knowledge base can be improved gradually.

Region Growth and Extraction Step Based on Morphological Characteristics

Firstly, an expansion operation is performed on deformation feature points in a deformation region skeleton, and then an erosion operation is performed thereon, and a noise region of a short length is removed and a deformation region of confidence (ROC) is generated. Next, morphological characteristics of the ROC are used to conduct a region growth to extract a target, so as to guarantee the completeness of the detection of deformation regions.

Step of Feature Extraction of Deformation Region

According to some embodiments of the invention, statistics on deformation characteristic values of deformation regions on a surface of an object, such as linear characteristic values (depth, length, width, curvature, direction and distance, etc. of a deformation region), area array characteristic values (depth, area, etc. of a deformation region), and features regarding degree of deformation (such as light, medium and heavy), and the like, are made based on predefined deformation features.

Example 1

1) Knowledge Base

This embodiment takes asphalt pavement crack identification as an example, and describes a method for extracting crack features of an asphalt pavement based on linear scanning three-dimensional point cloud.

An asphalt pavement crack feature knowledge base includes the following information: pavement texture model, a length of a crack>10 cm, a depth of a crack>1 mm, crack having directivity (transverse crack, longitudinal crack, rimous crack, block crack), continuity, aggregation, crack being deformation of small area in a sectional profile, crack being under a road surface, crack having a depth greater than a depth of common pavement texture, crack having a certain width, crack having an area characteristics, and crack having characteristics showing a degree of damage.

In the asphalt pavement crack feature knowledge base, a calculating method for an area of a crack, types of direction of the crack and a degree of damage of the crack can be defined according to specifications of various countries or defined according to usage, for example, the area of the crack can be defined as the area of a minimum circumscribed rectangle of a crack region.

2) Data Acquisition

A way for acquiring three-dimensional point cloud data of a surface of an asphalt pavement is as follows: a three-dimensional measurement sensor is mounted on a carrying vehicle, and the measurement sensor acquires data of three-dimensional sectional profile of a measured object during the carrying vehicle is travelling at a normal speed.

3) Data Preprocessing

This example uses a calibration file to correct systematic errors due to sensor installation and a radian of laser lines in a sectional profile of an object measured by the three-dimensional measurement sensor. In addition, due to changes in a measurement environment, there may be some abnormal noise points in the sectional profile of a pavement measured by the three-dimensional measurement sensor (a point with a value of zero occurs as there is water stain, oil stain on a surface of a measured object or a measured area is covered by an object, etc.). According to the embodiment of the the present invention, the point with the value of zero is substituted by a value obtained by averaging non-zero values in an area approximate to the point with the value of zero; and a series of sections having been preprocessed are stitched in a car traveling direction to obtain three dimensional point cloud data of the asphalt pavement.

4) Sectional Main Profile Extraction

Figure 5:
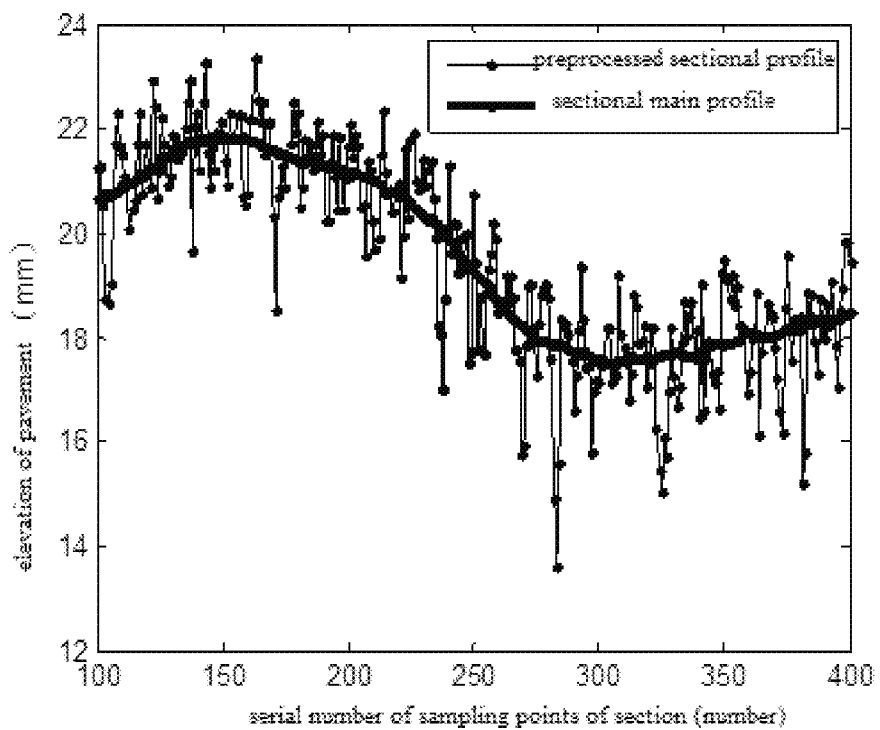
FIG. 5 is a diagram showing an example of extracting a main profile of section 1.
Figure 6:
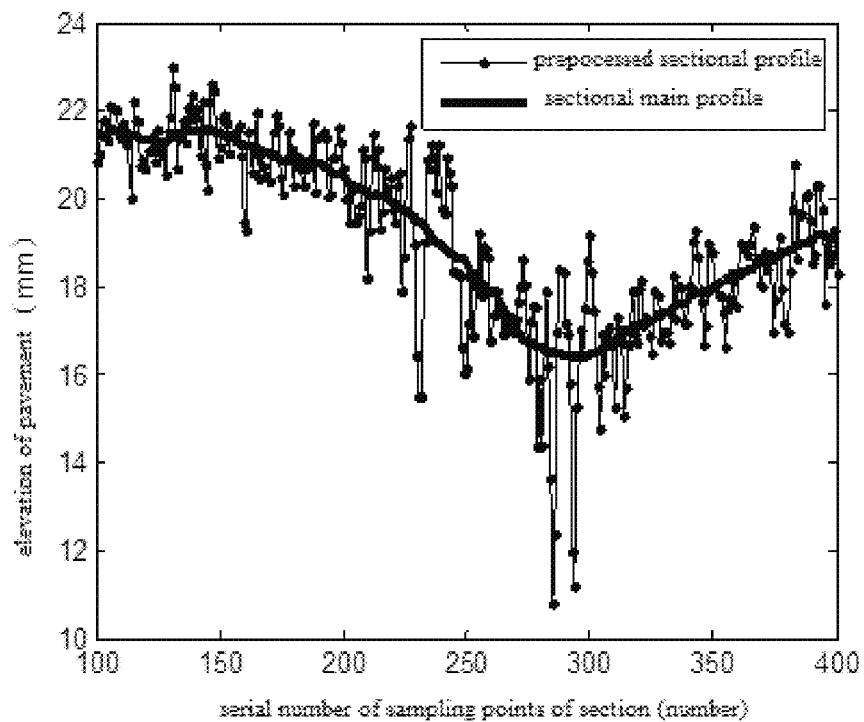
FIG. 6 is a diagram showing an example of extracting a main profile of section 2.

In the present example, a median filtering is first performed on a preprocessed sectional profile to preliminarily obtain a reference sectional profile, in which abnormal data and large texture have been removed, then absolute distances from points of the preprocessed sectional profile to points of the reference sectional profile are calculated, and the calculated distances are sorted; according to characteristics of a sectional profile, an appropriate proportion P (about 70%) of profile points, which deviate from the reference sectional profile by small distances, are selected, while profile points which deviate from the reference sectional profile by large distances are substituted by points on the reference sectional profile, and a mean filtering is performed on the selected points, and then a sectional main profile is obtained. FIGS. 5 and 6 respectively show examples for extracting a sectional main profile of the $100^{th} \sim 400^{th}$ points measured on two cross sections selected arbitrarily.

5) Extraction of Deformation Feature Points of a Sectional Profile

Figure 7:
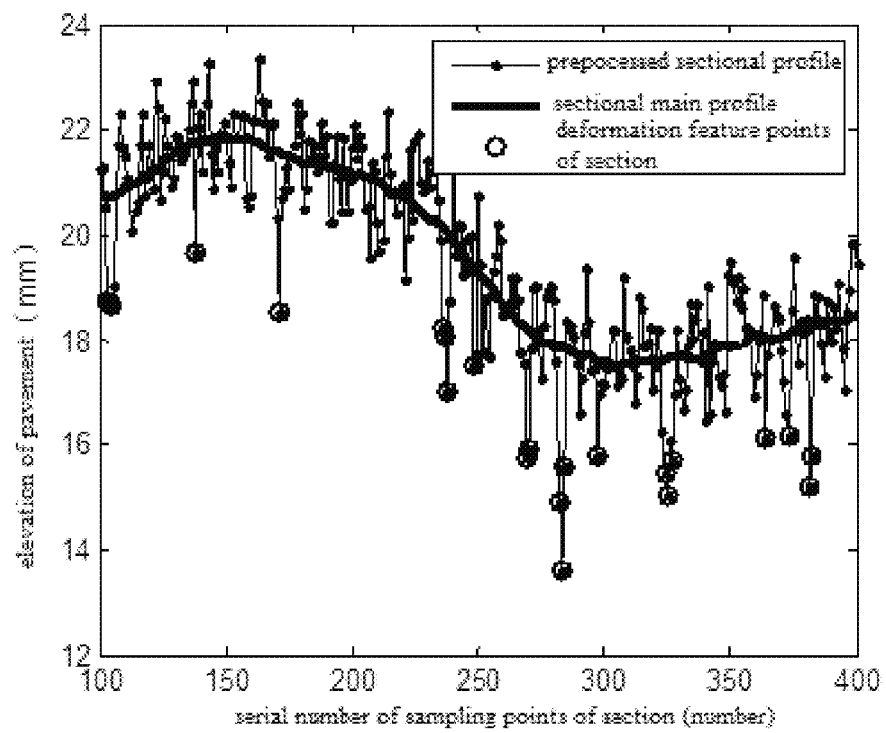
FIG. 7 is a diagram showing an example of extracting deformation feature points of a sectional profile 1.
Figure 8:
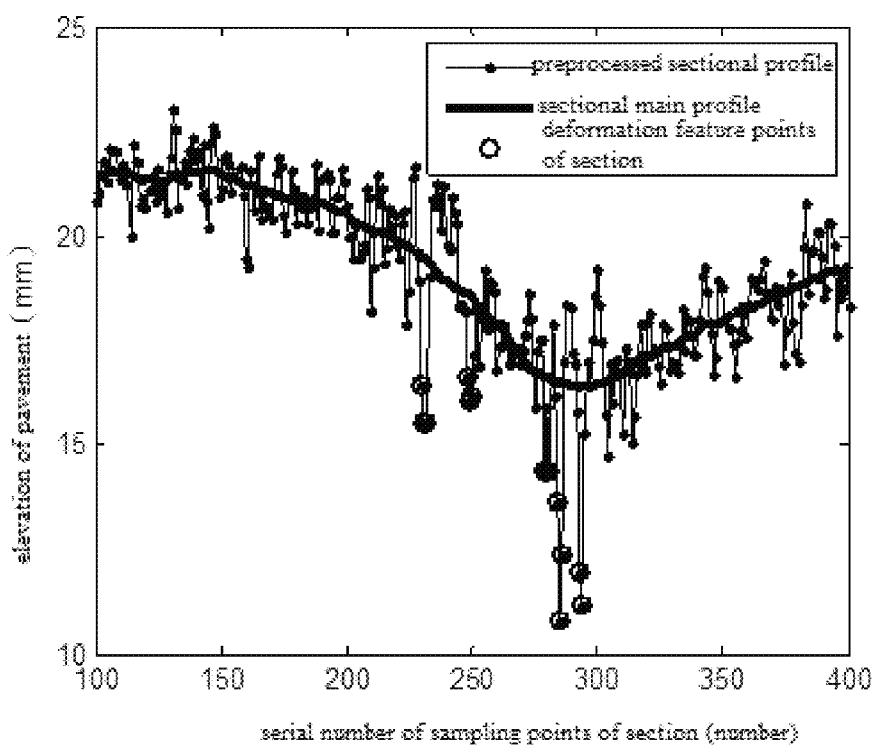
FIG. 8 is a diagram showing an example of extracting deformation feature points of a sectional profile 2.

For individual profiles of a pavement, a single sectional profile is taken as one calculation unit, and a pavement texture value of a current sectional profile is calculated in combination with a pavement texture model in a deformation feature knowledge base, thereby obtaining the pavement texture value Tex of the current sectional profile, and then points distances of which are greater than the threshold $T_j = K*Tex$ are selected from profile points lower than a surface of the pavement, as deformation feature points, where K(K=2.5) is a texture coefficient. In addition, for the stitched three-dimensional point cloud, taking a pavement profile along a car driving direction as a new sectional profile, deformation feature points can also be extracted according to the above method. FIG. 7 and FIG. 8 respectively show examples for extracting deformation feature points of the $100^{th} \sim 400^{th}$ points measured on two cross sections selected arbitrarily, in which the texture values of the two sections are 0.7078 mm and 0.7939 mm, respectively.

6) Positioning a Set of Deformation Target Morphology Sub-Blocks

Figure 9:
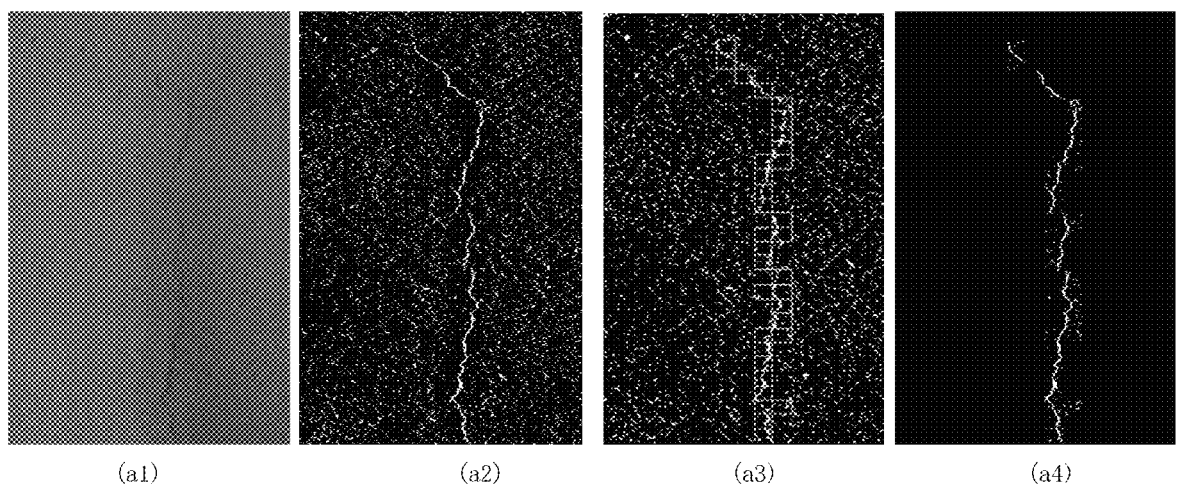
FIG. 9 is a diagram showing an example of positioning a deformation region 1. From left to right, a1, a2, a3, and a4 are sequentially an original image, a binary image, a set of deformation target morphology sub-blocks, and feature points in the set of deformation target morphology sub-blocks, respectively.
Figure 10:
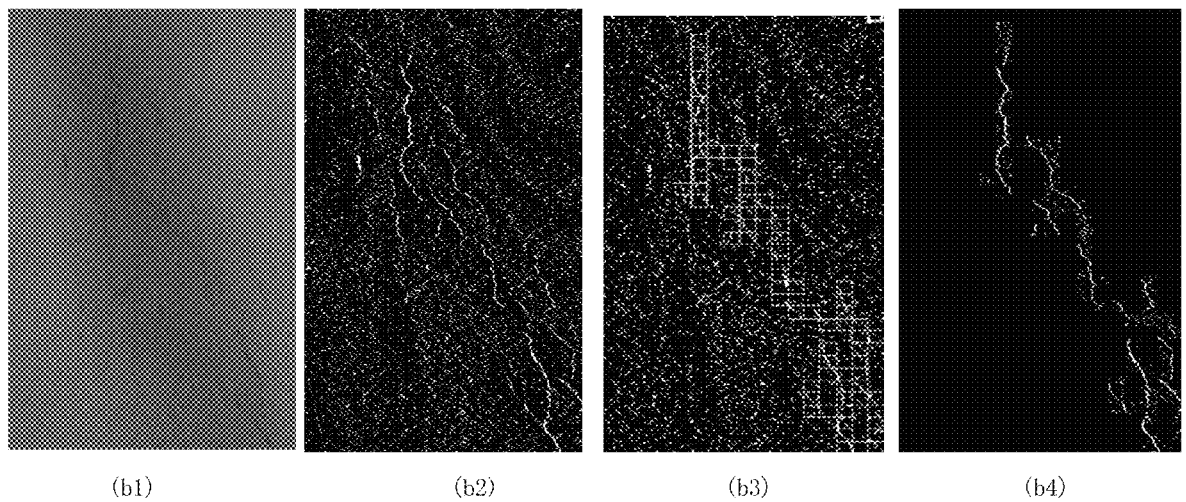
FIG. 10 is a diagram showing an example of positioning a deformation region 2. From left to right, b1, b2, b3, and b4 are sequentially an original image, a binary image, a set of deformation target morphology sub-blocks, and feature points in the set of deformation target morphology sub-blocks.

In the present disclosure, the extracted deformation feature points of a series of sections are formed into a characteristic binary image, as shown in FIG. 9 (a2) and FIG. 10 (b2), and statistics are made on the lengths and directions of various connected regions in the binary image, and then the current binary image is reasonably divided into image sub-blocks that do not overlap with each other. For each sub-block, a sub-block, in which the current deformation feature points have a long connected region and good linearity, is used as a deformation target morphology sub-block, as shown by a rectangular frame in FIG. 9 (a3) and FIG. 10 (b3), and then feature points of the deformation region are quickly and accurately positioned, as shown in FIG. 9 (a4) and FIG. 10 (b4).

7) Regional Growth and Extraction Based on Morphological Characteristics

A morphological operation is performed on deformation feature points in a set of deformation target sub-blocks, and connected regions of short-length are removed, and a deformation region of confidence (ROC) is generated. Next, a region growth is performed to extract a target using geometrical features of the ROC so as to guarantee completeness of detection of deformation regions.

8) Feature Extraction of a Deformation Region

Statistics are made on deformation features of a crack region according to predefined deformation features, such as a length of a crack, a width of a crack, average depth of a crack, direction or type of a crack (transverse crack, longitudinal crack, rimous crack, block crack), an area of a crack, degree of damage of a crack, etc.

Example 2

1) Knowledge Base

This example takes license plate identification as an example, and describes a method for extracting features of a license plate based on linear scanning three-dimensional point cloud.
A license plate feature knowledge base may include the following information: license plate having deformations of small area in a sectional profile thereof, license plate having a depth typically greater than a depth of background texture, license plate having a regular geometrical feature, which is typically a rectangular with a size of 440 mm×220 mm.

2) Data Acquisition

A way for acquiring three-dimensional point cloud data of a license plate is as follows: a three-dimensional measurement sensor is mounted on a carrying vehicle, while a license plate is on a road, and the measurement sensor acquires data of a three-dimensional sectional profile of a measured object during the carrying vehicle is travelling at a normal speed.

3) Data Preprocessing

This example uses a calibration file to correct systematic errors due to sensor installation and a radian of laser lines in a sectional profile of an object measured by the three-dimensional measurement sensor; and a series of sections having been preprocessed are stitched in a car traveling direction to obtain three dimensional point cloud data.

4) Sectional Main Profile Extraction

Figure 11:
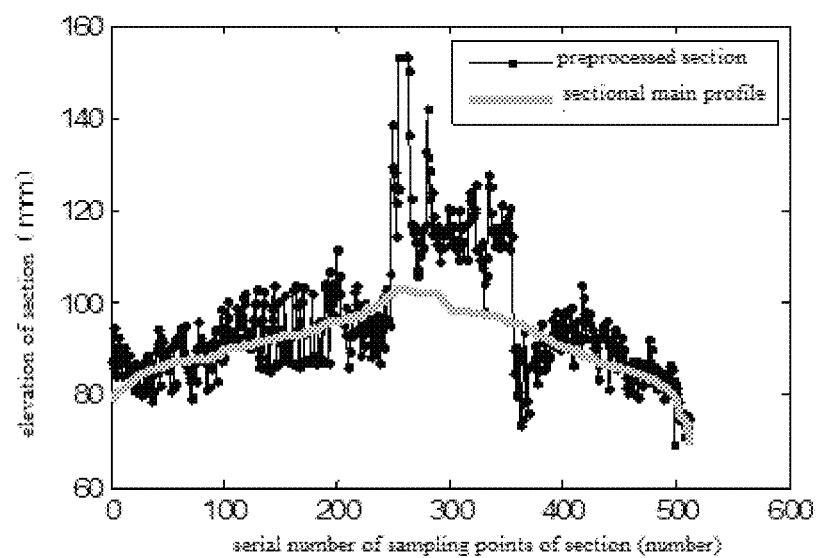
FIG. 11 is a diagram showing an example of extracting a sectional main profile in an embodiment for detecting a license plate.

In the present example, a median filtering is firstly performed on the preprocessed sectional profile, then absolute distances from points of the preprocessed sectional profile to points of a reference sectional profile are calculated, and the calculated distances are sorted. According to characteristics of a sectional profile, an appropriate proportion P (about 70%) of profile points, which deviate from the reference sectional profile by small distances, are selected, while profile points which deviate from the reference sectional profile by large distances are substituted by points on the reference sectional profile, and a mean filtering is performed on the selected points, and then a sectional main profile is obtained, as shown in FIG. 11.

5) Extraction of Deformation Feature Points of a Sectional Profile

Figure 12:
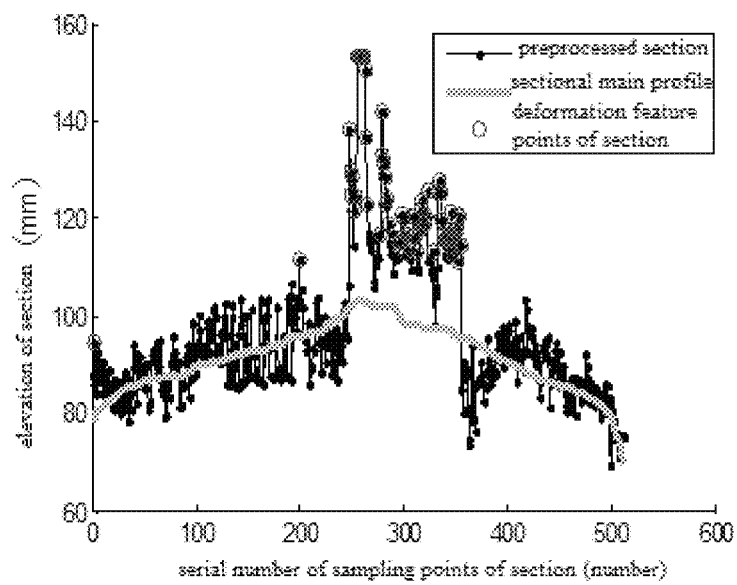
FIG. 12 is a diagram showing an example of extracting deformation feature points of a section in an embodiment for detecting a license plate.

Taking a single sectional profile as one calculation unit, a texture value of a current sectional profile is calculated in combination with a background texture model in a deformation feature knowledge base, thereby obtaining the texture value Tex of the current sectional profile, and then points distances of which are greater than the threshold T3=K*Tex are selected from profile points lower than a surface of the pavement, as deformation feature points, where K(K=3) is a texture coefficient. In addition, for the stitched three-dimensional point cloud, taking a pavement profile along a car driving direction as a new sectional profile, deformation feature points can also be extracted according to the above method. FIG. 12 shows an example for extracting deformation feature points of the 48$^{th}$ cross section, in which the texture values of the two sections are 0.7925 mm.

6) Positioning a Set of Deformation Target Morphology Sub-Blocks

Figure 13:
FIG. 13 is a diagram showing a binary image composed of deformation feature points in an embodiment for detecting a license plate.
Figure 14:
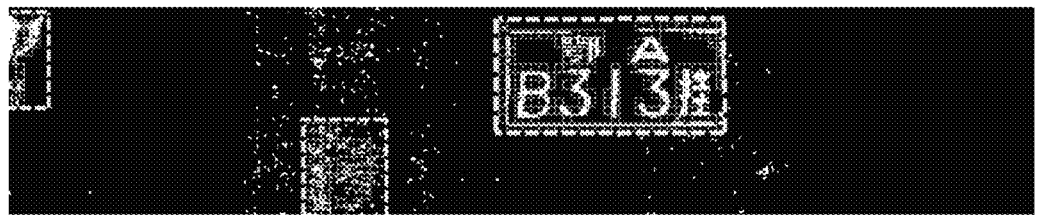
FIG. 14 is a diagram showing a set of deformation target morphology sub-blocks preliminarily positioned in an embodiment for detecting a license plate.
Figure 15:
FIG. 15 is a diagram showing a set of target morphology sub-blocks positioned according to a size of a license plate in an embodiment for detecting a license plate.
Figure 16:
FIG. 16 is a diagram showing a region of the license plate extracted in an embodiment for detecting a license plate.

In the present example, the extracted deformation feature points of a series of sections are formed into a characteristic binary image, as shown in FIG. 13, and the current binary image is reasonably divided into image sub-blocks that do not overlap with each other. For each sub-block, a sub-block, in which the current deformation feature points have a long connected region and good linearity, is used as a deformation target morphology sub-block, as shown by a rectangular frame in FIG. 14, and then the sets of deformation target morphology sub-blocks are quickly and accurately positioned. Statistics are made on the lengths and the widths of various sets of morphology sub-blocks, and those sets of deformation morphology sub-blocks whose lengths and widths are not in conformity with the size of a license plate are removed, so as to obtain a set of license plate morphology sub-blocks, as shown in FIG. 15.

7) Regional Growth and Extraction Based on Morphological Characteristics

A morphological operation is performed on deformation feature points in the set of deformation target sub-blocks, and connected regions of short lengths are removed, and a deformation region of confidence (ROC) is generated. Next, a region growth is performed to extract a target using geometrical features of the ROC so as to guarantee completeness of detection of the deformation region.

8) Feature Extraction of a Deformation Region

Statistics are made on deformation features of an region of a license plate according to predefined deformation features, such as a length of the license plate, a width of the license plate, an area of the license plate, etc.

It should be noted that the above specific embodiments are only intended to illustrate the technical solutions of the present invention, and not to be construed as limiting the scope of the present invention. Although the invention are described in detail with reference to preferred embodiments, those skilled in the art should understand that the technical solutions in the disclosed embodiments can be modified or substituted in an equivalent way without departing from the spirit and scope of the invention, which are covered in the appended claims.

The invention claimed is:

1. A method for extracting surface deformation features of an object based on a linear scanning three-dimensional point cloud, comprising:
    step 1: performing data acquisition by using a three-dimensional measurement sensor based on line structured light scanning to realize synchronous measurement of sectional profiles at same attitudes and at same times;
    step 2: preprocessing the sectional profiles of the object measured by the three-dimensional measurement sensor by correcting a systematic error due to an installation deviation of the three-dimensional measurement sensor and a radian of laser lines in the measurement through a calibration file;
    step 3: extracting sectional main profiles from the preprocessed sectional profiles of the object one by one;
    step 4: obtaining features of the type of a large area deformation by analyzing a deviation between the sectional main profiles and standard profiles and obtaining features of the type of a small area deformation by analyzing a deviation between the preprocessed sectional profiles and the sectional main profiles, based on characteristics of the sectional profiles; and extracting deformation feature points of the sectional profiles in combination with a deformation feature knowledge base;
    step 5: forming a characteristic binary image by the deformation feature points, and making statistics on lengths and geometries of various connected regions in the characteristic binary image in combination with the deformation feature knowledge base, and then dividing the characteristic binary image into image sub-blocks which do not overlap with each other; for each image sub-block, labeling the image sub-block as a deformation target morphology sub-block if the image sub-block contains a long connected region or has feature points that have target morphological characteristics;
    step 6: performing a morphological operation on deformation feature points in a set of deformation target morphology sub-blocks, removing noise regions of short-length, and generating a deformation region of confidence ROC; and then performing a region growth to extract a target using the deformation region of confidence;
    step 7: making statistics on deformation characteristic values of a deformation region in the surface of the object, including linear characteristic values, area array characteristic values, and degrees of deformation, according to predefined deformation features.

2. The method of claim 1, wherein the step 4 further comprises: perfecting information in the deformation feature knowledge base after the deformation feature points of the sectional profiles are extracted.

3. The method of claim 1 or 2, wherein the step 5 further comprises perfecting information in the deformation feature knowledge base.

4. The method of claim 1, wherein the step 2 further comprises correcting abnormal points with a value of 0 on the sectional profiles of the object.

5. The method of claim 1, wherein the step 3, extracting the sectional main profiles from the preprocessed sectional profiles of the object one by one comprises:
    (1) performing a median filtering on the preprocessed sectional profiles $PP_j$, $PP_j=\{PP_{j1}, PP_{j2}, \ldots, PP_{jn}\}$, where n is the number of points measured on a single section, to preliminarily obtain reference sectional profiles $RP_j$, $RP_j=\{RP_{j1}, RP_{j2}, \ldots, RP_{jn}\}$, in which abnormal data and texture have been removed, where n is the number of points measured on a single section;
    (2) calculating absolute distances $D_j$, $D_j=\{D_{j1}, D_{j2}, \ldots, D_{jn}\}$, from points of the preprocessed sectional profiles to points of the reference sectional profiles, where $D_{ji}=|PP_{ji}-RP_{ji}|$, i=1, 2, ..., n, and n is the number of points measured on a single section;
    (3) sorting elements in calculated distances $D_j$ in ascending order to form a new set of distances $S_j$, $S_j=\{S_{j1}, S_{j2}, \ldots, S_{jn}\}$, where n is the number of points measured on a single section;
    (4) calculating a threshold $T_{j1}$, $T_{j1}=S_{jk}$, where k is a value obtained by rounding up a value of n*p, and p is a value of 60%-98%;
    (5) selecting and generating a new set of profile points $NP_j$, $NP_j=\{NP_{j1}, NP_{j2}, \ldots, NP_{jn}\}$, where n is the number of points measured on a single section; calculating values of elements in the set of profile points $NP_j$ according to the following formula:

$$NP_{ji} = \begin{cases} PP_{ji}, & PP_{ji} \le T_{j1} \\ RP_{ji}, & PP_{ji} > T_{j1} \end{cases} \quad i=1, 2, \ldots, n;$$

performing a mean filtering on the selected set of profile points $NP_j$, thereby obtaining the sectional main profile $MP_j$, $MP_j=\{MP_{j1}, MP_{j2}, \ldots, MP_{jn}\}$, where n is the number of points measured on a single section.

6. The method of claim 1, wherein the step 4 comprises: extracting deformation feature points of the type of large area deformation of the current $j^{th}$ sectional profile, where j=1, 2, ..., m, and m is the number of sections acquired, comprising:
    (1) taking the preprocessed sectional profile $PP_j$ and the sectional main profile $MP_j$ as inputs, $PP_j=\{PP_{j1}, PP_{j2}, \ldots, PP_{jn}\}$, $MP_j=\{MP_{j1}, MP_{j2}, \ldots, MP_{jn}\}$, where n is the number of points measured on a single section;
    (2) extracting a standard profile $SP_j$ matching with the current sectional profile $PP_j$, where $SP_j=\{SP_{j1}, SP_{j2}, \ldots, SP_{jn}\}$, in combination with acquisition position information of a section, where n is the number of points measured on a single section;
    (3) calculating deviations between the sectional main profile $MP_{ji}$ and the standard profile $SP_{ji}$, to form a set of deviations $DEV_j$, $DEV_j=\{DEV_{j1}, DEV_{j2}, \ldots, DEV_{jn}\}$, $DEV_{ji}=|MP_{ji}-SP_{ji}|$, i=1, 2, ..., n;
    (4) extracting points whose deviations are greater than an accuracy requirement of detection of deformation $T_2$, as deformation feature points, and labeling the points with a value of 1, otherwise with a value of 0, and recording the values into a set of deformation feature label values $F_j=\{F_{j1}, F_{j2}, \ldots, F_{jn}\}$;

$$F_{ji} = \begin{cases} 1, & DEV_{ji} \geq T_2 \\ 0, & DEV_{ji} < T_2 \end{cases} \quad i = 1, 2, \ldots, n$$

(5) outputting the set of deformation feature label values $F_j$;

extracting deformation feature points of the type of small area deformation of the current $j^{th}$ sectional profile, where j=1, 2, ..., m, and m is the number of sections acquired, comprising:
(1) taking the preprocessed sectional profile $PP_j$ and the sectional main profile $MP_j$ as inputs, $PP_j=\{PP_{j1}, PP_{j2}, \ldots, PP_{jn}\}$, $MP_j=\{MP_{j1}, MP_{j2}, \ldots, MP_{jn}\}$, where n is the number of points measured on a section;
(2) calculating absolute distances $DIS_j$, $DIS_j=\{DIS_{j1}, DIS_{j2}, \ldots, DIS_{jn}\}$, between various points of the preprocessed sectional profile $PP_j$ and corresponding points of the sectional main profile $MP_j$, where $DIS_{ji}=|PP_{ji}-MP_{ji}|$, i=1, 2, ..., n, and n is the number of points measured on a section; and then averaging the absolute distances $Avg\_DIS_j=\Sigma_{i=1}^n DIS_{ji}/n$, so as to obtain a pavement texture value $Tex_j=Avg\_DIS_j$ of current section;
(3) calculating points whose sectional deformation point segmentation threshold $T_{j3}=K*Tex_j$, where K is a threshold coefficient, and K>1;
(4) calculating distances $S_j$, $S_j=\{S_{j1}, S_{j2}, \ldots, S_{jn}\}$, between various points of the preprocessed sectional profile $PP_j$ and corresponding points of the sectional main profile $MP_j$, where $S_{ji}=PP_{ji}-MP_{ji}$, or $S_{ji}=MP_{ji}-PP_{ji}$ or $S_{ji}=|MP_{ji}-PP_{ji}|$, i=1, 2, ..., n, and n is the number of points measured on a section;
(5) extracting points whose deviations are larger than the deformation point segmentation threshold $T_{j3}$ as the deformation feature points, and labeling the points with a value of 1, otherwise with a value of 0, and recording them into a set of deformation feature label values $F_j=\{F_{j1}, F_{j2}, \ldots, F_{jn}\}$;

$$F_{ji} = \begin{cases} 1, & S_i \geq T_{j3} \\ 0, & S_i < T_{j3} \end{cases} \quad i = 1, 2, \ldots, n$$

(6) outputting the set of deformation feature label values $F_j$.

7. The method of claim 1, wherein the step 5 comprises:
(1) inputting deformation feature points $F_j$ of a series of sections continuously acquired in the order of sections being acquired, where j=1, 2, ..., m;
(2) sequentially stitching extracted deformation feature points of the series of sections to form a characteristic binary image $F=\{F_{ji}|j=1, 2, \ldots, m, i=1, 2, \ldots, n\}$;
(3) performing connected domain labeling on the binary image, recording label values as $FR=\{FR_{ji}|j=1, 2, \ldots, m, i=1, 2, \ldots, n\}$, and making statistics on lengths $URL_u$ and geometries of various connected regions $UR_u$ in a connected domain labeling image FR, where $UR_u$ is a connected region with a label value of u, u=1, 2, ..., U, U is the total number of the connected regions, and $URL_u$ is a length of a long side or diagonal of a circumscribed rectangle of the connected region with the label value of u;
(4) dividing a current binary image reasonably into image sub-blocks $SU=\{SU_{xy}|x=1, 2, \ldots, M, 1, 2, \ldots, N\}$, $SU_{xy}=\{F_{ji}|j\in X_x, i\in Y_y\}$, which do not overlap with each other and have a size of sm*sn respectively, where M=m/sm is the number of sub-blocks in a row direction in a sub-block image, and N=n/sn is the number of sub-blocks in a column direction in the sub-block image, $X_x\in[(x-1)*sm+1\ x*sm]$ and $X_x\in Z^*$, $Y_y\in[(y-1)*sn+1\ y*sn]$ and $Y_y\in Z^*$;
(5) obtaining morphological characteristics of deformation feature points in various image sub-blocks, including directional feature $SUD_{xy}$, where x=1, 2, ..., M, y=1, 2, ..., N, in combination with morphological characteristics of a deformation target;
(6) setting x=1, and y=1; starting to discuss whether the current image sub-block is a deformation target morphology unit;
(7) if a sub-block image contains a connected region with a length greater than $T_4$, which is obtained from the deformation knowledge base, then labeling the current sub-block as the deformation target morphology unit, which calculates according to the following formula, and recording a label value $FSU_{xy}=1$, otherwise going to a step (8);

$$FSU_{xy} = \begin{cases} 1, & \exists u = FR_{ji}, \text{where } j \in X_x, i \in Y_y \text{ s.t. } URL_u \geq T_4 \\ 0, & \text{otherwise} \end{cases}$$

(8) if the deformation feature points in the current sub-block image have deformation target morphological characteristics, labeling the current sub-block as a deformation target morphology unit, and recording a label value $FSU_{xy}=1$, otherwise recording a label value $FSU_{xy}=0$;
(9) if y is less than N, setting y=y+1 and going to step (7); otherwise, going to step (10);
(10) if x is less than M, setting x=x+1, y=1, and going to step (7); otherwise, going to step (11);
(11) outputting a set of deformation target morphology sub-blocks $FS=\{FS_{ji}|j=1, 2, \ldots, m, i=1, 2, \ldots, n\}$, whose values are calculated as follows:

$$FS_{ji} = \begin{cases} 1, & F_{ji} > 0 \text{ and } FSU_{xy} > 0, \text{where } j \in X_x, i \in Y_y \\ 0, & \text{otherwise} \end{cases}$$

8. The method of claim 2, wherein the step 5 further comprises perfecting information in the deformation feature knowledge base.

* * * * *